Aug. 24, 1954   V. E. GLEASMAN   2,687,195
ROTARY TURBINE TYPE TORQUE CONVERTER
Filed Sept. 22, 1949   3 Sheets-Sheet 1

INVENTOR
Vernon E. Gleasman
BY
ATTORNEYS

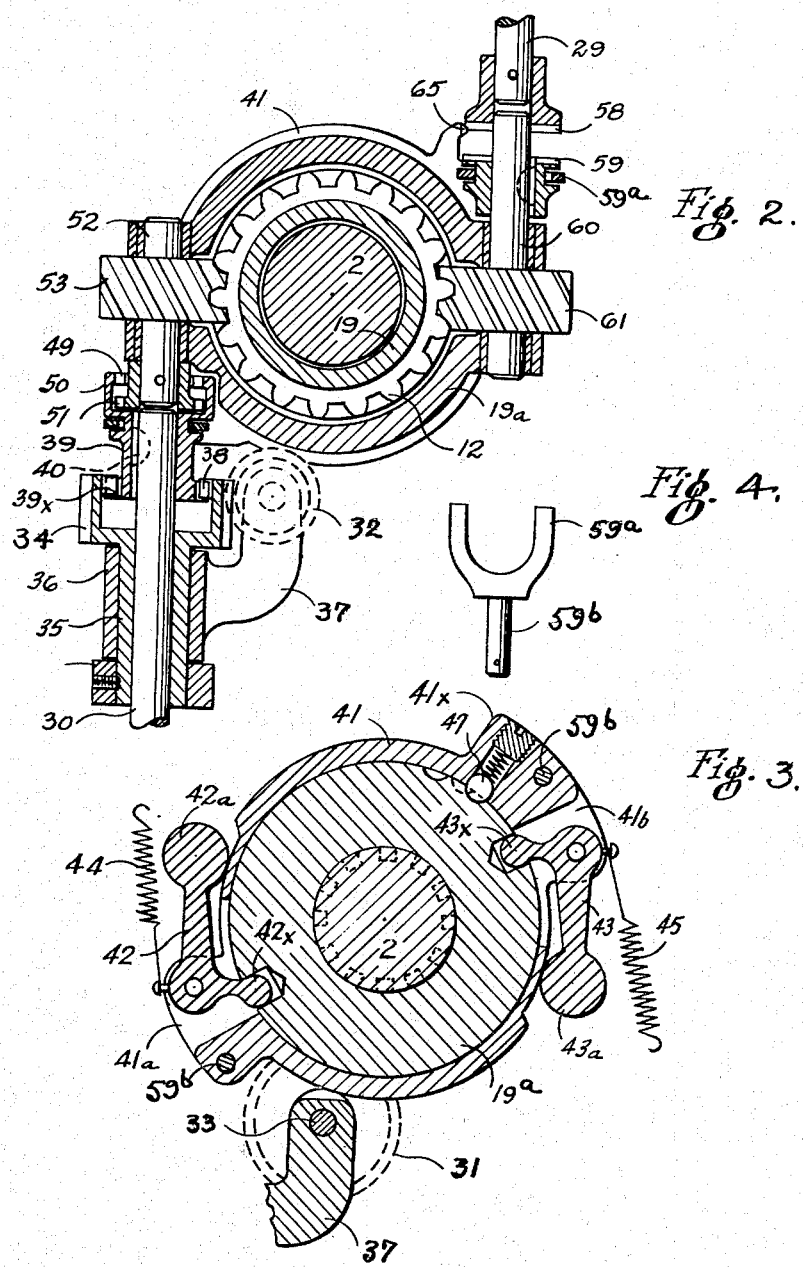

Aug. 24, 1954 V. E. GLEASMAN 2,687,195
ROTARY TURBINE TYPE TORQUE CONVERTER
Filed Sept. 22, 1949 3 Sheets-Sheet 3

INVENTOR.
VERNON E. GLEASMAN
BY
ATTORNEYS

Patented Aug. 24, 1954

2,687,195

UNITED STATES PATENT OFFICE 2,687,195

ROTARY TURBINE TYPE TORQUE CONVERTER

Vernon E. Gleasman, Elmira, N. Y.

Application September 22, 1949, Serial No. 117,215

12 Claims. (Cl. 192—3.2)

My invention relates to hydro-kinetic fluid transmission, and more particularly to the fluid fly-wheel type. Hydro-kinetic transmissions are not efficient for practical purposes when same approach a 1:1 ratio, and therefore when a 1:1 ratio is desired a complex arrangement of clutches and associated controls are required. Moreover, hydro-kinetic fluid fly-wheel type transmissions have definite torque limitations. These limitations are governed by the allowable sacrifice of efficiency when the fluid transmission elements are used as a fluid coupling; therefore it requires an automatic planetary or gear transmission to develop the required torque. A fluid coupling has proven to be an efficient coupling at substantially 1:1 ratio at high speeds, and the fluid transmission has proven to be efficient as long as there is an appreciable ratio reduction within the range of the design.

Therefore, my invention relates to a new means of combining the well known fluid fly-wheel type coupling with the well known fluid fly-wheel type torque converter unit, in such a manner that the design of one does not effect the efficiency or design of the other. By changing the fluid from the coupling section to the converter unit section, or vice versa, either one can be used independently of the other depending on the speed of the output shaft or load demand.

Another object of my invention is to provide a self-contained heat exchanger in my fluid transmission as hereinafter set forth.

These and further objects of my invention will be set forth in the following specification, reference being made to the accompanying drawing, it being understood that many changes may be made in the parts, and details of the construction, within the scope of the appended claims, without departing from the spirit of the invention.

The accompanying drawings disclose one organization of the mechanical elements, in which:

Fig. 2 is a transverse sectional view on the line 2—2, Fig. 5, showing the automatic control.

Fig. 3 is a transverse section taken on the line 3—3, Fig. 5, showing the flyweights and collar of the automatic control.

Fig. 4 is an elevation of one of the shifting yokes.

Figure 1:
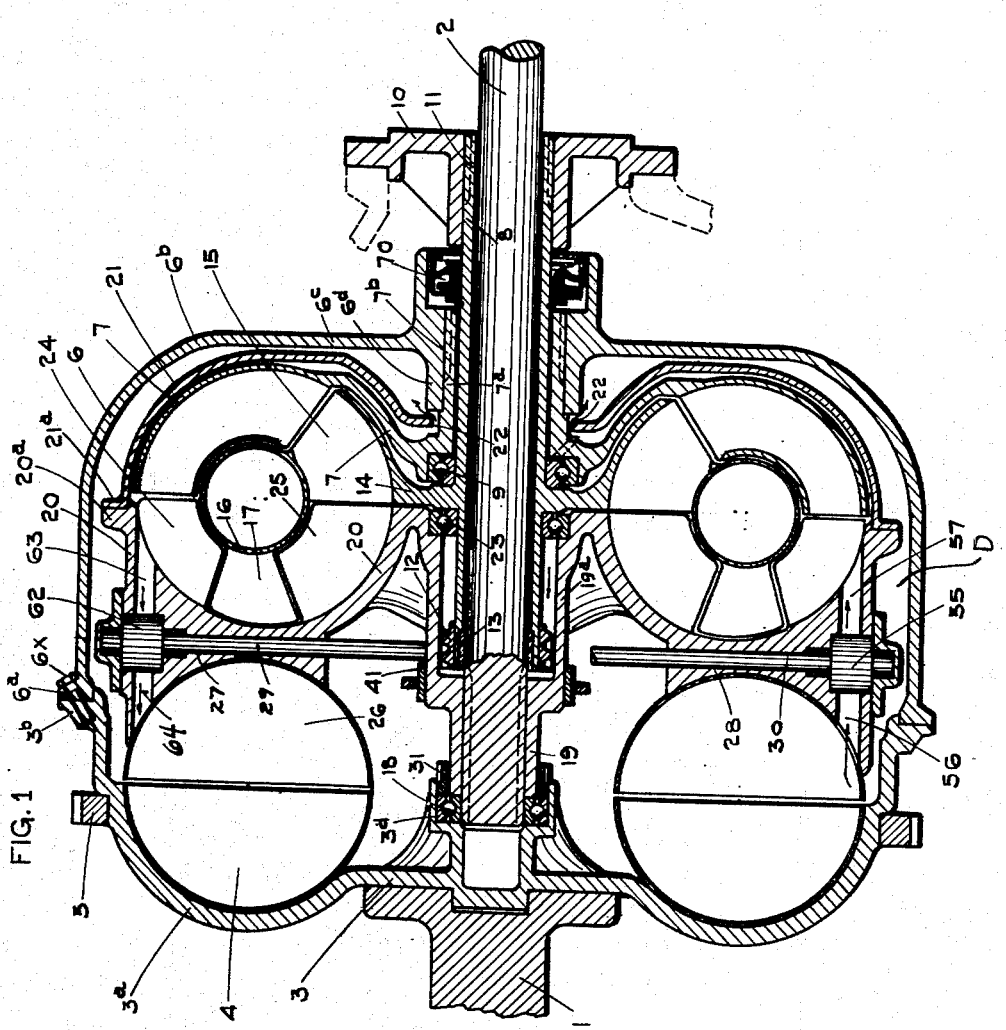
Figure 1 is a longitudinal section through my novel fluid transmission.

As shown, my novel fluid transmission comprises a prime mover or driving shaft 1, and a driven shaft 2, the same being preferably in axial alignment, but spaced axially apart. On the end of the prime mover shaft 1 is a housing 3 forming one end of a rotatable member having an arcuate portion 3a terminating in a peripheral annular flange 3b for the purpose hereinafter described. Preferably, the arcuate portion 3a directly carries the fluid coupling impeller 4 consisting of an annular formation of vanes of conventional design; and on the outer periphery of arcuate portion 3a is an external starter gear 5 which may be used with the conventional starter motor of an internal combustion engine.

Secured to the flange 3b is a housing extension 6 having a complementary flange 6a secured by bolts 6x to flange 3b, the housing 6 being extended to enclose the torque converter unit, and having its outer end rounded as at 6b and extending inwardly as at 6c, same terminating in a hub portion 6d which is mounted upon a hub portion 7a, the same being keyed thereto as at 7b, the hub portion 7a carrying the arcuate end portion of the converter impeller 7, hereinafter referred to.

As shown in Fig. 1 the hub 6d is provided on its outer end with an oil seal 70 of conventional form to prevent leakage of oil from the interior of the rotatable housing 3—6 along the fixed hollow shaft 8.

As shown, the hub portion 7a is supported by a fixed hollow shaft 8 through an antifriction bearing 9, the hollow shaft 8 surrounding the driven shaft 2 and fixedly entering a support 10, the same being keyed thereto as at 11. The hollow sleeve 8 is therefore non-rotatable but extends towards the prime mover shaft 1 and carries on its inner end within the rotatable housing 3—6 a spiral gear 12 for the purpose hereinafter described, a bearing 13 being preferably interposed between driven shaft 2 and the inner end of hollow shaft 8, shaft 8 terminating short of the inner end of the driven shaft 2. As shown, driven shaft 2 extends into a journal 3d in the casing member 3 and is supported by an antifriction bearing 18. An oil seal may be provided between the outer end of hollow shaft 8 and the driven shaft 2 to prevent leakage of oil between these parts, more particularly when support 10 does not consist of a reverse gear case.

Upon the fixed hollow shaft 8 within the converter impeller 7 is a portion 14 carrying fixed, converter reactor blades 15 secured at their outer ends to an annular tubular member 16 forming the inner wall of the converter turbulence chamber, said tubular member 16 also carrying other fixed converter reactor blades 17, for the purposes hereinafter described.

On the inner end of shaft 2 between the antifriction bearing 18 and the inner end of hollow shaft 8 is a hub 19 having an offset portion 19a overlying the gear 12 and extending substantially to the portion 14. The outer end of the enlargement 19a is supported on the fixed hollow shaft 8 by an antifriction bearing 23. Offset portion 19a carries a complementary converter runner 20 disposed opposite the converter impeller 7 and forming one-half of the converter chamber, the other half being formed by a substantially arcuate member 21 having a flange 21a secured by bolts or by welding to the flange 20a of runner 20. As shown, the member 21 curves inwardly around the converter impeller 7 closely adjacent thereto, and also lies closely adjacent the housing extension member 6b—6c the same terminating adjacent the inner end of the hub portion 6d, leaving a small opening 22 for the purpose hereinafter described.

Carried by the runner 20 are converter runner blades 24 and a second set of converter runner blades 25 spaced therefrom, the runner blades 24—25 thus rotating with the driven shaft 2 at all times. This arrangement of converter runner blades 24—25 and stationary converter reactor blades 15—17 and converter impeller utilize the conventional torque converter principles and need no detailed description herein. Although I have shown hollow shaft 8 held stationary, it is obvious that it may be allowed to free wheel if desired by any suitable one-way brake or locking means.

Formed integrally with the converter runner 20 are the coupling blades 26 for the fluid coupling, the same being of conventional form and consisting of an annular series of blades disposed opposite the blades 4 of the fluid coupling in the conventional manner.

In the runner 20 between the coupling blades 26 and the converter runner blades 24—25 are radial bores 27—28 for shafts 29—30, the shafts 29—30 being disposed at diametrically opposite sides of the gear 12, as shown in Fig. 2.

Mounted for rotation with the prime mover shaft 1 is a gear 31 (Figs. 1 and 5) for rotating gears 32 and 32a (Fig. 5) mounted on a shaft 33 carried by and journaled in hub 19, the same directly driving a gear 34 (Fig. 2) on a clutch sleeve 35 (Fig. 2), gear 32 and gear 34 being held in position by brackets 36—37, and sleeve 35 carrying the jaw clutch 38. In the position of parts shown in Fig. 2, the clutch teeth 38 are in mesh with the teeth 39x on a sleeve 39 which is keyed, as at 40, to shaft 30, and hence the shaft 30 is thus directly driven by prime mover shaft 1.

Rotatably mounted upon the hub enlargement 19a is a collar 41 carrying flyweight governors 42 and 43 which are pivoted on ears 41a and 41b of collar 41 and are urged by springs 44 and 45 into retracted position, said flyweights having lateral projections 42x and 43x entering holes in said hub enlargement 19a, as shown in Fig. 3.

On the collar 41 is a lateral extension 41x carrying spring pressed ball 47 adapted to engage one of three detents in the hub enlargement 19a, as shown in Fig. 3. In the position shown in Fig. 3 the sleeve 41 is in the position in which the flyweight governors 42—43 are fully retracted and the shaft 30 is thus being rotated directly by the prime mover shaft 1. When under action of centrifugal force of the rotating hub extension 19a the balls 42a—43a swing partially outwardly against the tension of springs 44—45, the detent ball 47 will engage the intermediate detent thereby shifting sleeve 39 downwardly as shown in Fig. 2 disengaging clutch member 38—39x and engaging the jaw teeth 49 of movable clutch collar 50 with the jaw teeth 51 which are fixedly secured to shaft 52 of a gear 53 which directly meshes with the gear 12, as shown. Consequently, the shaft 30 would then be directly driven by the driven shaft instead of the driving shaft through gear 12, thereby rotating the shaft 30 and the conventional gear pump 55 (Fig. 1) to pass fluid through the ducts 56—57 from the fluid coupling section into the torque converter section, as shown by the arrows in Fig. 1.

When the flyweights 42—43 are further projected by centrifugal force the collar 41 will be rotated to engage the detent ball 47 (Fig. 3) in the remaining detent of the series, at which time the collar 41 will have been shifted in a rotary manner to engage the clutch teeth 58 (Fig. 2) with the clutch teeth 59 on the shaft 60 of a gear 61 which also directly meshes with the gear 12, at which time the shaft 29 will be directly driven by the gear 12, the shaft 29 carrying a conventional fluid pump 62 (Fig. 1) for transferring fluid from the converter section through ducts 63 and 64 from the converter section to the fluid coupling section in the direction of the arrows.

Obviously when the clutch teeth 58—59 are engaged the clutch teeth 49—51, and clutch teeth 38—39x are disengaged, and only the shaft 29 will be driven by the gear 12. A clutch fork 59a (Fig. 4) is provided for the shifting of the clutch 59 and sleeve 39 (Fig. 2). Fork 59a is provided with a shank 59b for attaching to collar 41 (Fig. 3). In addition the collar 41 is provided with a detent or lock 65 (Fig. 2) to engage between the clutch teeth 58 when in the disengaged position shown in Fig. 2. However, when the collar 41 is rotated to engage the clutch teeth 58 with the teeth 59 the detent 65 will have been shifted away from the clutch teeth 58. The object of the arrangement of the detent 65 with respect to the teeth 58 is to prevent the pump shaft from rotating due solely to fluid pressure on the pump 62. A similar detent (not shown) may be provided with respect to the pump shaft 30 if desired. Although I have shown an automatic control, it is obvious that a manual control may be utilized, separately or in combination therewith.

Figure 5:
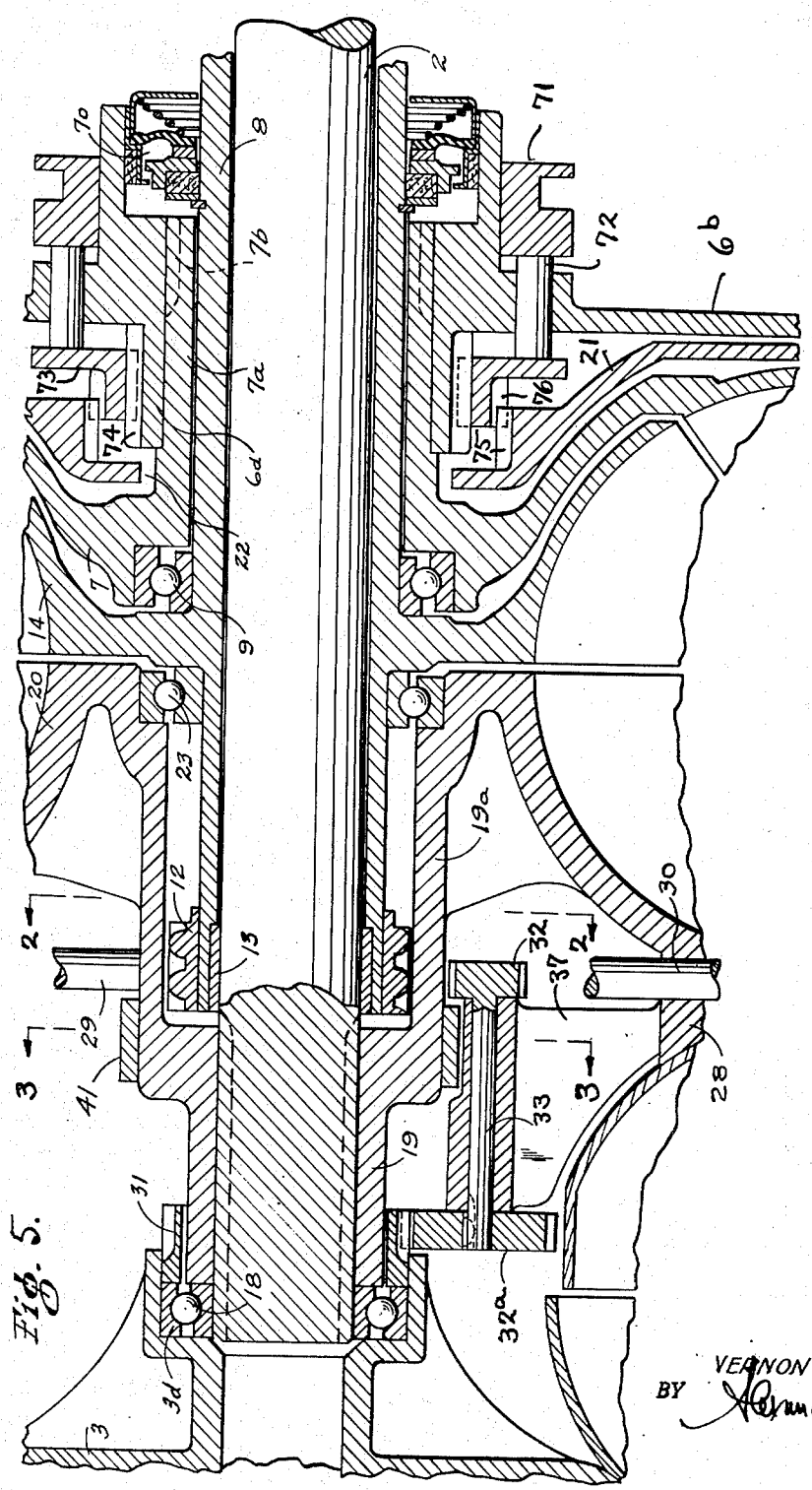
Fig. 5 is a view taken in the horizontal plane through Fig. 1, showing the relation of the pump gearing elements and the optional clutch means.

By the above construction it is obvious that when the speed ratio is approximately 1:1, the plate 21 which rotates with the driven shaft 2 is rotating at approximately the same speed as the plate 6b which is directly driven by the prime mover shaft 1. Therefore, if desired, a clutch or lock may be provided between the parallel portions of the plates 21 and 6c (Fig. 1) to positively lock the same against relative rotation, thereby providing a direct drive feature at approximately 1:1 ratio. One form of clutch means is shown in Fig. 5 wherein 71 is a slidable mounted clutch collar on the hub extension of end wall 6b. The clutch collar 71 is provided with a means to anchor the outer ends of pins 72, the inner ends of the pins being affixed to the slidable mounted clutch member 73 which is keyed with splines 74 to end plate 6b. The plate 21 is provided with internal teeth 75 to receive engagement of corresponding teeth 76 on clutch member 73.

In operation, by shifting the collar 71 to the right (Fig. 5) the clutch teeth 75 and 76 will be disengaged, and when the collar 71 is shifted to the left (Fig. 5) the clutch teeth 75 and 76 will be engaged, thereby providing a positive drive. Pins 72 can be provided with conventional seals to avoid loss of fluid due to leakage around the pins. Although a jaw clutch is shown in Fig. 5, it is understood that a friction clutch might be utilized.

My novel above described hydro-kinetic fluid transmission constitutes a new fully automatic self-contained arrangement combining a fluid coupling and torque converter unit. This combination allows the application of true converter principles with the desired torque multiplication without handicapping the design as a fluid coupling; and also dispenses with the use of a gear transmission and by-passes the handicaps now experienced in the designing of a torque converter unit which will also act and attempt to perform the function of a fluid coupling, and therefore has definite limitations as to torque multiplication and requires an automatic transmission to supply the required torque.

It is a well known fact that a fluid transmission peaks off at approximately 1800 to 2000 R. P. M., and when this speed is exceeded the efficiency curve starts to decline rapidly by reason of the interference of the stationary reactor blades, this interference becoming apparent when the converter ceases to multiply torque and approaches a 1:1 torque transfer.

Referring to my drawings and specification, it can be seen that the converter section can be supplied with fluid and that the fluid coupling section will be empty which is necessary to allow the converter section to have full control of the ratio to a point where the stationary converter reactor blades 15 and 17 cease to multiply torque and normally set up a resistance in the fluid tract. At this point the fluid is directly transferred from the converter section as disclosed in the specification, and therefore empties the converter section so as to prevent the stationary reactor blades 15 and 17 from setting up a resistance while the fluid coupling section is in operation. Having control in the design of the fluid transition there will be no apparent break in the power curve.

By an inspection of the drawings it will be noted that the torque converter section can be designed utilizing true converter principles and likewise the fluid coupling design is based on true coupling principles unaffected by the converter design, thus utilizing a proven fluid coupling which has a high efficiency at high speeds as well as utilizing a fluid transmission which has proven feasible to multiply torque up to a speed where a fluid coupling can take over.

Referring to the drawings, associated with the coupling and converter is a flyweight governor arrangement carried by the driven shaft member in order that the flyweights will be affected by road speeds. The function of the governor is to select and engage the proper transition pump (55 or 62), and it is obvious that when the pump 55 is being driven, cool fluid will be pumped out of the rotating chamber D which acts as a heat exchanger by reason of the entire unit rotating as a fly wheel, and being that the pump 55 continues to be driven while the converter section is utilized, consequently there will be a continuous flow of fluid through the converter, exhausting it at the center as indicated by arrows at 22 where centrifugal force returns it again to the periphery of chamber D. This condition continues until such time that the drive shaft speed has increased to a point where the converter has reached its peak efficiency. This feature also prevents foaming. The flyweight governors will automatically drop pump 55 and engage the opposite transition pump 62, therefore pumping the fluid from the converter section to the fluid coupling section as disclosed. Therefore the stationary reactor blades 15 and 17 can offer no resistance at high speed. Consequently the fluid transmission will be as efficient as a fluid coupling at high speed.

I do not limit my invention to the exact form shown in the drawings, for obviously changes may be made therein within the scope of the claims.

I claim:

1. In a fluid fly-wheel type transmission having a fluid coupling section and a fluid converter section, a drive shaft; a driven shaft axially aligned with and spaced from the drive shaft; a non-rotatable hollow shaft around the driven shaft terminating short of the inner end thereof; a closed housing to hold a quantity of fluid rotated by the drive shaft and overlying the inner ends of the driven shaft and hollow shaft and journaled on the hollow shaft, one end of the housing being provided with an annular series of blades forming the impeller of the fluid coupling section; an arcuate impeller having blades rotatable with the housing and disposed in the converter section; fixed reactor blades on the non-rotatable hollow shaft cooperating with the arcuate impeller; a hub on the inner end of the driven shaft within the housing carrying a portion of the converter section; a plate on the hub portion completing the converter section and extending inwardly around the arcuate impeller between said impeller and the adjacent end of the housing, said plate terminating adjacent the hub of the arcuate impeller; spaced sets of runner blades carried by the hub on the driven shaft and cooperating with the fixed reactor blades; other runner blades on the hub of the driven shaft cooperating with and disposed opposite the said series of coupling impeller blades; and transition means for passing the fluid from the coupling section into the converter section, and vice versa, depending on the speed of the driven shaft.

2. In a converter as set forth in claim 1, a gear on the end of the hollow shaft within the housing; and said transition means comprising oppositely extending pump shafts at opposite sides of said gear disposed in the hub member each carrying fluid pumps disposed in ducts connecting the fluid coupling section and the fluid converter section respectively; pinions on said shafts meshing with said gear; a collar rotatably mounted on the said hub; governors on the collar controlling the rotary movement thereof; a normally engaged clutch on said shaft connecting the drive shaft with one of said pump shafts, said clutch disengaging when the collar is shifted; a second clutch means on said pump shaft normally disconnected from the related pinion; means actuated by initial shifting of the collar to disconnect the first clutch and engage the second clutch; and a third normally disengaged clutch actuated by said collar and adapted to be engaged when the first and second clutches are disengaged upon further shifting of the collar.

3. In a torque converter as set forth in claim 2, means for preventing the shaft of the second and third clutches from rotating by fluid pressure in said ducts when the said clutches are disengaged.

4. In a torque converter as set forth in claim 1, means for positively locking the housing and plate member together when the speed ratio is substantially 1:1.

5. In a fluid fly-wheel type transmission having a fluid coupling section and a fluid converter section, a drive shaft; a driven shaft axially aligned with and spaced from the drive shaft; a non-rotatable hollow shaft around the driven shaft terminating short of the inner end thereof; a closed housing to hold a quantity of fluid secured at one end to the drive shaft and overlying the inner ends of the driven shaft and hollow shaft, the other end of the housing having a hub portion journaled on the hollow shaft, the end of the housing adjacent the drive shaft having a semi-circular recess provided with an annular series of blades forming the impeller of the fluid coupling section; an arcuate impeller having blades rotatable with the housing and disposed in the converter section; fixed reactor blades on the non-rotatable hollow shaft cooperating with the arcuate impeller; a hub on the inner end of the driven shaft within the housing carrying a portion of the converter section; a plate on the hub completing the converter section and extending inwardly around the arcuate impeller between said impeller and the adjacent end of the housing, said plate terminating adjacent the hollow shaft; spaced sets of inner blades carried by the hub on the driven shaft and cooperating with the fixed reactor blades; other runner blades on the hub of the driven shaft cooperating with and disposed opposite the said series of coupling impeller blades; and transition means for passing the fluid from the coupling section into the converter section, and vice versa.

6. In a converter as set forth in claim 5, a gear on the end of the hollow shaft within the housing; and said transition means comprising oppositely extending pump shafts at opposite sides of said gear disposed in the hub member each carrying fluid pumps disposed in ducts connecting the fluid coupling section and the fluid converter section respectively; pinions on said shafts meshing with said gear; a collar rotatably mounted on the said hub; governors on the collar controlling the rotary movement thereof; a normally engaged clutch on said shaft connecting the drive shaft with one of said pump shafts, said clutch disengaging when the collar is shifted; a second clutch means on said pump shaft normally disconnected from the related pinion, means actuated by initial shifting of the collar to disconnect the first clutch and engage the second clutch; and a third normally disengaged clutch actuated by said collar and adapted to be engaged when the first and second clutches are disengaged upon further shifting of the collar.

7. In a torque converter as set forth in claim 6, means for preventing the shaft of the second and third clutches from rotating by fluid pressure in said ducts when the said clutches are disengaged.

8. In a torque converter as set forth in claim 5, means for positivley locking the housing and plate member together when the speed ratio is substantially 1:1.

9. In a fluid fly-wheel type transmission having a fluid coupling section and a fluid converter section, a drive shaft; a driven shaft axially aligned with and spaced from the drive shaft; a hollow shaft around the drive shaft terminating short of the inner end thereof; a closed rotatable housing to hold a quantity of fluid secured at one end to the drive shaft and overlying the inner ends of the driven shaft and hollow shaft, the other end of the housing having a hub portion journaled on the hollow shaft, the end of the housing adjacent the drive shaft having a semi-circular recess provided with an annular series of blades forming the impeller of the fluid coupling section; a hub within the housing rotatably connected with the hub portion of the housing, said hub carrying an arcuate impeller in the converter section; fixed reactor blades mounted on the non-rotatable hollow shaft and cooperating with the arcuate impeller; a second hub on the inner end of the driven shaft within the housing and carrying a portion forming half of the converter section; an arcuate plate completing the converter section and extending inwardly around the converter impeller between the arcuate impeller and adjacent end of the housing, said plate terminating adjacent the hub which carries the arcuate impeller; spaced sets of runner blades carried by the second hub and cooperating with the fixed reactor blades; other runner blades on the second hub cooperating with and disposed opposite the coupling impeller blades of the fluid coupling section; and transition means for passing the fluid from the coupling section into the converter section, and vice versa, depending on the speed of the driven shaft.

10. In a torque converter as set forth in claim 9, a spiral gear on the end of the hollow shaft within the housing; and said transition means comprising oppositely extending pump shafts at opposite sides of said spiral gear disposed in the second hub member each carrying fluid pumps disposed in ducts connecting the fluid coupling section and the fluid converter section respectively; pinions on said shafts meshing with said spiral gear; a collar rotatably mounted on the second hub; fly-weight governors on the collar controlling the rotary movement thereof; a normally engaged clutch on said shaft connecting the drive shaft with one of said pump shafts, said clutch disengaging when the collar is shifted; a second clutch means on said pump shaft normally disconnected from the related pinion on said pump shaft; means actuated by initial shifting of the collar to disconnect the first clutch and engage the second clutch; and a third normally disengaged clutch actuated by said collar and adapted to be engaged when the first and second clutches are disengaged upon further shifting of the collar.

11. In a torque converter as set forth in claim 10, means for preventing the shaft of the second and third clutches from rotating by fluid pressure in said ducts when the said clutches are disengaged.

12. In a torque converter as set forth in claim 9, means for positively locking the housing and plate member together when the speed ratio is substantially 1:1.

References Cited in the file of this patent

UNITED STATES PATENTS

| Number | Name | Date |
| --- | --- | --- |
| 2,018,616 | Martyrer et al. | Oct. 22, 1935 |
| 2,212,901 | Schneider | Aug. 27, 1940 |